United States Patent Office 3,106,676
Patented Oct. 8, 1963

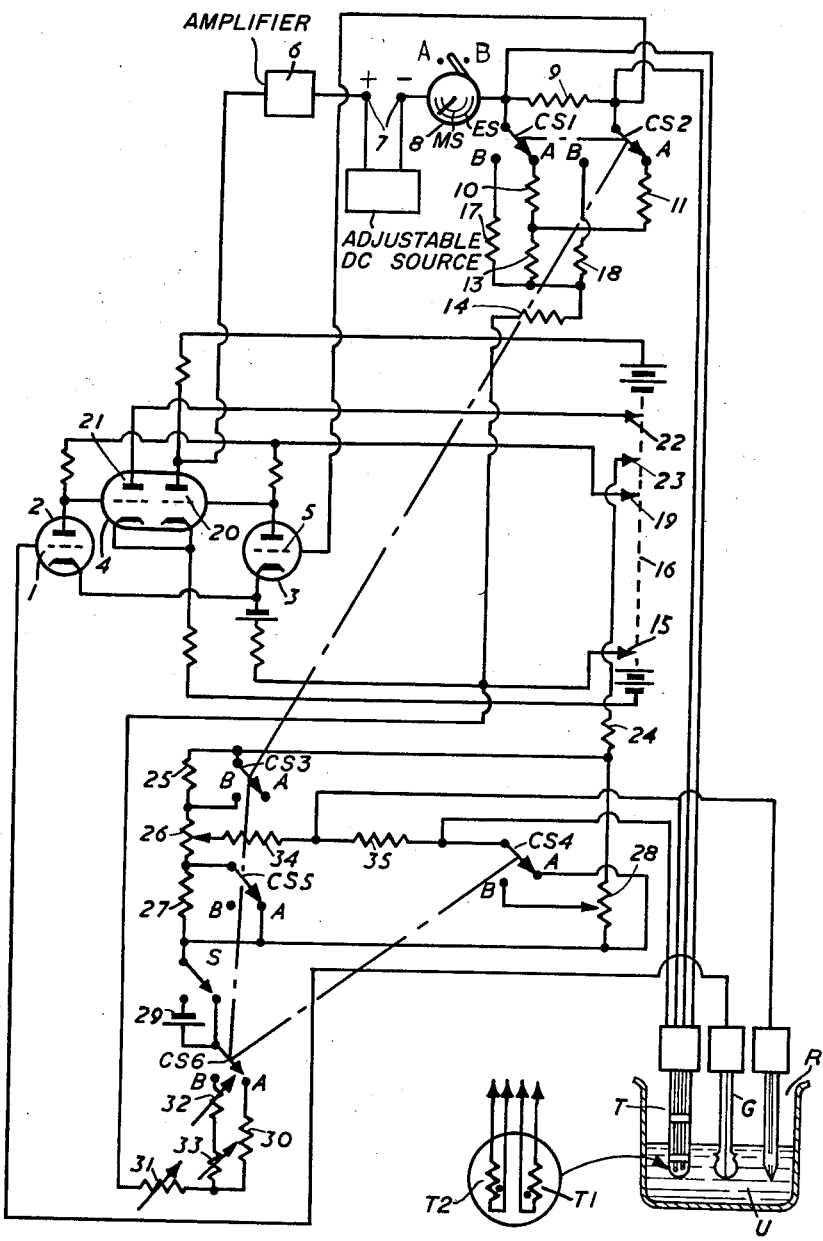

3,106,676
pH METER WITH TEMPERATURE COMPENSATED LARGE RANGE SCALE AND SMALL RANGE EXPANDED SCALE
Frank Slater and Maximilian Weber, St. Albans, England, assignors to Marconi Instruments Limited, London, England, a British company
Filed Dec. 9, 1960, Ser. No. 74,808
Claims priority, application Great Britain Dec. 18, 1959
9 Claims. (Cl. 324—30)

This invention relates to pH meters and has for its object to provide improved pH meters which will give pH readings either on a main large range scale or on an expanded small range scale which can be, in effect, moved along the main scale so as to correspond to desired different parts of the said main scale, said meter being such as to give fully temperature compensated readings irrespective of the scale in use and, when the expanded scale is in use, irrespective of the part of the main scale which it is adjusted to cover.

As is well known, in order to provide full temperature compensation in a pH meter it is necessary to provide for what may be termed "slope" compensation and also for what may be termed "initial" compensation. Slope compensation is compensation for temperature variation of the ratio of voltage fed in to the indicating instrument (normally an ordinary millivoltmeter) to pH indication. Initial compensation is compensation for temperature variation of the zero shift or asymmetry correcting potential which has to be fed in to the indicating instrument in order that its zero shall be correct.

It is comparatively easy and is common practice to provide such full temperature compensation in pH meters of the single scale type, but considerable difficulties arise in providing full temperature compensation in a pH meter having two scales, because the degree and law of compensation required when the other scale is in use. A pH meter having a main scale and an expanded scale which could be in effect moved over the main scale so as to indicate in an expanded manner any part of the main scale, would be most attractive practically, but the provision of full temperature compensation in all conditions of use of such an instrument offers such great difficulties that, so far as the present applicants are aware, no fully compensated pH meter of this nature has yet become available. The present invention seeks to solve these difficulties and to provide a pH meter having a main scale and an expanded scale which can be moved over the main scale and which shall be such that full temperature compensation is provided under all conditions of use without calculation or reference to temperature correction graphs or tables by the user.

According to this invention in its broadest aspect a pH meter includes a voltage responsive instrument having a relatively large range main scale and a relatively small range expanded scale which can be used to read over different parts of the main scale; means for changing over the instrument to read either on its main scale or on its expanded scale; amplifier means for applying to said instrument a pH representative voltage which, when the main scale is in use, is appropriate to that scale and is fully temperature compensated, including both slope and initial compensation appropriate to that scale; and means operable when the expanded scale is in use for changing the voltage fed to the instrument to a value appropriate to the expanded scale and simultaneously altering the temperature compensation, both as respects slope compensation and initial compensation, to make the changed overall temperature compensation appropriate to the expanded scale, the last mentioned means including means, gang controlled with the means for changing the part of the main scale covered by the expanded scale, for varying the initial temperature compensation.

It will be seen that the invention causes the temperature compensation to be suited not only to the scale in use but, when the expanded scale is in use, to the effective position of that scale along the main scale.

According to a feature of this invention a pH meter adapted to be actuated by an electrode system including a glass electrode and a reference electrode inserted in a solution to be measured comprises: an amplifier adapted to amplify voltage appearing at the glass electrode; a voltage responsive measuring instrument having a relatively large range scale and a relatively small range expanded scale; scale selecting change-over means operable at will for bringing either the main scale or the expanded scale into use; means for applying to said instrument a voltage which compensates as regards temperature for different parts of the combined voltage from the glass electrode and the reference electrode and includes a first component derived from said amplifier and variable in dependence upon glass electrode voltage over a relatively large range appropriate to the main scale, and a second component dependent upon reference electrode voltage; change-over means for changing said first component from a voltage variable over a relatively small range appropriate to the expanded scale; expanded scale setting means for setting the voltage which is variable over the smaller range at desired different parts of the range of voltage which is variable over the relatively large range; means for bringing said scale setting means into and out of use; first temperature responsive means responsive to the temperature of the solution to be measured for controlling the gain of the amplifier at either of two selectable predetermined rates, one appropriate for use when the main scale is in operation and the other appropriate for use when the expanded scale is in operation; means gang-controlled with said setting means for varying the second component of voltage applied to said instrument; additional temperature responsive means also responsive to the temperature of the solution to be measured for varying said second component; and means for selecting the rate of control of said additional temperature responsive means to be either at one predetermined rate appropriate for use when the main scale is in operation or at a different rate which is appropriate when the expanded scale is in operation and is dependent on the setting of said setting means.

Preferably the setting means are continuously adjustable whereby the range covered by the expanded scale is caused to be movable in effect continuously over the range covered by the main scale.

Preferably also the scale selecting change-over means, the change-over means for changing the voltage variation range of the first component of the voltage applied to the instrument, the means for bringing the setting means into or out of use, the means for selecting the rate of control of the first temperature responsive means and the means for selecting the rate of control of the additional temperature responsive means are all gang controlled.

In a preferred embodiment the amplifier is a differential amplifier with one input terminal fed with voltage appearing at the glass electrode and another fed through a feedback loop which includes the instrument and a temperature-sensitive resistance constituting the first temperature responsive means, means being provided for applying across a resistance in said loop and through either of two switch selectable resistance networks, a voltage derived from a fixed voltage source. In this embodiment the additional temperature responsive means is a temperature sensitive resistance included in one diagonal of a bridge, the other of which is included in series with either of two switch selectable circuits across part of a source of potential for the amplifier and potential from the reference electrode is applied to a point in the first mentioned diagonal, one of the two switch selectable circuits including a variable resistance constituting the setting means and the switching being such that, when said one selectable circuit is switched in certain predetermined values of resistance are included in the ratio arms of the bridge and one end of the first mentioned diagonal is constituted by the slider of a potentiometer ganged with said variable resistance while, when the second of said selectable circuits is switched in, said end of the first mentioned diagonal is a fixed point and the values of certain other predetermined values of resistances in the ratio arms are changed.

Preferably the other end of said first mentioned diagonal is constituted by the adjustable member of a potentiometer.

It is convenient for the expanded scale to have a central zero and the main scale to have a zero at one end. If the zeros of the scales are so arranged the said second switch selectable circuit contains an added fixed resistance of such value that when the instrument is changed over from use of the main scale to use of the expanded scale the zero of the expanded scale is correctly in the middle of the range to which it has been set by the setting means.

In order to provide a facility for checking the gain adjustment of the amplifier it is of advantage to provide means for superimposing at will a predetermined potential in series between the bridge and the two selectable circuits. If this is done it is readily observable whether or not switching in of this potential produces a known correct change of instrument reading.

The invention is illustrated in the accompanying drawing which is a diagram of one embodiment thereof.

Referring to the drawing, the meter therein shown is adapted for use with a known pH meter electrode system (also shown) comprising a temperature probe T, a glass electrode G and a reference electrode R all as known per se and all adapted to be inserted as indicated in the solution U whose pH value is to be measured. The temperature probe T, the end of which is shown in enlarged diagrammatic form, as indicated by the linked circles, contains two temperature sensitive resistances T1 and T2 which may be, for example, thermistors. In using the meter the glass electrode G is connected to one input grid 1 of a valve 2 included in a differential amplifier arrangement which also includes the valve 3 and a double triode valve 4. As will be apparent from the diagram the valve 4 produces at its anode 20 an output which is dependent upon the difference between the inputs to the grid 1 of the valve 2 and the grid 5 of the valve 3. The amplified output from the differential amplifier is further amplified in any convenient additional amplifier 6 which is part of a feedback loop leading back to the second input terminal of the differential amplifier, namely the grid 5 of the valve 3. The feedback loop also includes a source (not shown) of direct current potential which may conveniently be adjustable and is applied between the terminals 7, a millivoltmeter 8 and a resistance 9. The millivoltmeter 8 has two scales, one of which is expanded with relation to the other and covers a smaller range. For example, the main scale, M.S., may read from 0 to 14 in pH units and the expanded scale, E.S., may be a center zero scale covering a range of 2.8 pH units, i.e. ±1.4 pH units with reference to its central zero. The thermistor T1 is connected across the resistance 9. Also connected to the ends of this resistance are two ganged switches CS1 and CS2. The diagram shows a number of switches all referenced CS with an added numeral reference and all the switches so marked are ganged so that they all either occupy the positions marked A in the drawing or they all occupy the positions marked B in the drawing. These switches are also ganged with a switch indicated purely diagrammatically by its handle and which changes over the instrument 8 from its main scale, M.S., to its expanded scale, E.S. The two positions for the instrument changeover handle are also marked A and B. All the positions A are positions in which the main scale is in use and all the positions B are positions in which the expanded scale is in use.

The A contacts of the switches CS1 and CS2 are connected together through separate resistances 10 and 11, a common resistance 13 and a further common resistance 14 to a tap 15 on the main potential source 16 from which operating potentials for the whole meter are obtained.

The B contacts of the switches CS1 and CS2 are connected together through separate resistances 17 and 18 and the common resistance 14 to the tap 15. Anode potential for the valves 2 and 3 is taken from the tap 19; anode potential for the anode 20 of the valve 4 is taken from the positive end of the source 16; and anode potential for the anode 21 of the valve 4 is taken from the tap 22. The cathode circuits of the valves 2 and 3 are returned as shown to the tap 15 and the cathode return for the valve 4 is made to the negative end of the source 16.

A further tap 23 between the taps 22 and 19 on the source 16 is connected through a resistance 24 to the end of one diagonal of a Wheatstone bridge, the ratio arm resistances of which are provided by resistances 25, 26, 27 and 28, of which the resistances 26 and 28 are potentiometer resistances with sliders thereon. The other end of this diagonal of the bridge is connected through a switch S either directly to a switch CS6 or through a source of potential 29 to said switch CS6 depending upon the position of the switch S, the normal position being that shown. The switch CS6 can select either of two circuits to be in series with the bridge depending upon whether the said switch CS6 is in its A position or in its B position. In its A position it selects a circuit including resistance 30 and a variable resistance 31. In its B position it selects a circuit including two variable resistances 32 and 33 and the aforesaid resistance 31. The far end of resistance 31 is connected to the tap 15.

The second diagonal of the bridge includes a resistance 34 in series with a resistance 35 across which the thermistor T2 is connected. The reference electrode R is connected to the junction point of the resistances 34 and 35. In this bridge diagonal is included the arm of a switch CS4 which in its A position makes connection with the junction point of the resistances 28 and 27, and in its B position makes connection with the slider on the resistance 28. The far end of resistance 34 is connected to the slider on the resistance 26. Further switches CS3 and CS5 are provided across the resistance 25 and 27 respectively, the switch CS3 shorting the resistance 25 when in its B position and the switch CS5 shorting the resistance 27 when in its A position. The control for the resistance 33 is ganged with the control for the slider on the potentiometer 28.

Suppose all the gang controlled switches are in their A positions with the instrument 8 switched to read on its main scale. Then the resistances 10, 11 and 13 are in circuit in the network controlled by the switches CS1 and CS2 while, in the network controlled by the switches CS3, CS4 and CS5, the resistance 25 will be in circuit, the resistance 27 will be short circuited, and the switch CS4 will connect one end of the bridge diagonal containing resistance 35 to the junction point of the resistances 28 and 27. The resistance 30 will be in circuit and the resistances 32 and 33 out of circuit. The various values of the resistances are such and the adjustments of the whole circuit are such that in these circumstances the temperature compensation applied is correct, both as regards slope compensation and initial compensation, to suit the main scale of the instrument 8. The selection of the values of the various resistances is in accordance with known principles. The slope compensation is determined by the network controlled by the switches CS1 and CS2 and by the thermistor T1 included therein, this network controlling the feedback and therefore the gain of the differential amplifier. The initial compensation is determined by the network controlled by the switches CS3, CS4, CS5 and CS6 and by the thermistor T2 included therein.

When the gang control is moved over to its B position the expanded scale is brought into use. In these circumstances the resistances 17 and 18 replace the resistances 10, 11 and 13 in the network controlled by the switches CS1 and CS2; the resistances in the ratio arms of the bridge are changed by the new positions adopted by the switches CS3 and CS5; and the diagonal of the bridge which includes the resistance 35 is now between the sliders on the resistances 26 and 28. Also the switch CS6 takes the resistance 30 out of circuit and substitutes for it the series resistances 32 and 33. Adjustment of the resistance 33 which may be continuously variable or variable in discrete steps, has the effect of altering the position of the expanded scale along the main scale, and adjustment of the slider on the resistance 28 (this adjustment is, as already stated, ganged with the adjustment of the resistance 33) secures the result that correct temperature compensation is still obtained despite the fact that as the resistance 33 is adjusted the expanded scale is in effect moved along the main scale so that, for each different adjustment of the resistance 33 the expanded scale starts at a different pH value. The resistance 32 is only a fine control resistance for operation in conjunction with coarse control by the resistance 33. The control effected by adjustment of resistance 32 is made enough to render it in practice unnecessary to gang the said resistance 32 with the slider on the resistance 28. The resistance 30, which is cut out when the switch CS6 is moved to the B position, is provided in order to take into account the fact that in the meter now being described, the main scale has a zero at one end and the expanded scale has a center zero. This resistance 30 is accordingly dimensioned to ensure that when the gang control is moved from its A position to its B position the zero reading on the expanded scale will correspond with the reading on the main scale when the gang control was moved from position A.

The resistance 31 is adjusted to compensate for the fixed component of pH-independent voltage values appearing in the glass electrode output. This fixed component varies from one glass electrode to another. In any pH measuring system using a given glass electrode and a reference electrode there will be found some value of pH at which the voltage appearing from the glass electrode is independent of temperature over a substantial range of temperatures. This value, which is different for different glass electrodes, is commonly called the "isopotential point" of the electrode, and glass electrodes can be purchased with this point specified. The variable resistance 26, which can be calibrated in isopotential points, provides an adjustment enabling the meter to be adjusted to suit the isopotential points of any particular glass electrode in use.

The switch S and potential source 29 are provided to enable the general gain adjustment of the meter to be conveniently checked. The potential source 29 is of a known value such as should provide, if the gain of the meter is correctly adjusted, a known change of instrument reading when said source is switched in. Gain adjustment can therefore be checked by switching in the source 29 and observing if the meter reading changes by the correct amount.

We claim:

1. A pH meter including a voltage responsive instrument having a relatively large range main scale and a relatively small range expanded scale which can be used to read over different parts of the main scale; means for changing over the instrument to read either on its main scale or on its expanded scale; temperature compensated amplifier means for applying to said instrument a pH representative voltage which, when the main scale is in use, is appropriate to that scale and is fully temperature compensated, including both slope and initial compensation appropriate to that scale; and means operable when the expanded scale is in use for changing the voltage fed to the instrument to a value appropriate to the expanded scale and simultaneously altering the temperature compensation, both as respects slope compensation and initial compensation to make the changed overall temperature compensation appropriate to the expanded scale, the last mentioned means including means, gang controlled with the means for changing the part of the main scale covered by the expanded scale, for varying the initial temperature compensation.

2. A pH meter adapted to be actuated by an electrode system including a glass electrode and a reference electrode inserted in a solution to be measured, said meter comprising an amplifier adapted to amplify voltage appearing at the glass electrode; a voltage responsive measuring instrument having a relatively large range scale and a relatively small range expanded scale; scale selecting change-over means operable at will for bringing either the main scale or the expanded scale into use; means for applying to said instrument a voltage which compensates as regards temperature for different parts of the combined voltage from the glass electrode and the reference electrode and includes a first component derived from said amplifier and variable in dependence upon glass electrode voltage over a relatively large range appropriate to the main scale, and a second component dependent upon reference electrode voltage; change-over means for changing said first component from a voltage variable over a relatively large range appropriate to the main scale to a voltage variable over a relatively small range appropriate to the expanded scale; expanded scale setting means for setting the voltage which is variable over the smaller range at desired different parts of the range of voltage which is variable over the relatively large range; means for bringing said scale setting means into and out of use; first temperature responsive means responsive to the temperature of the solution to be measured for controlling the gain of the amplifier at either of two selectable predetermined rates, one appropriate for use when the main scale is in operation and the other appropriate for use when the expanded scale is in operation; means gang-controlled with said setting means for varying the second component of voltage applied to said instrument; additional temperature responsive means also responsive to the temperature of the solution to be measured for varying said second component; and means for selecting the rate of control of said additional temperature responsive means to be either at one predetermined rate appropriate for use when the main scale is in operation or at a different rate which is appropriate when the expanded scale is in operation and is dependent on the setting of said setting means.

3. A meter as claimed in claim 2 wherein the setting means are continuously adjustable whereby the range covered by the expanded scale is caused to be movable in effect continuously over the range covered by the main scale.

4. A meter as claimed in claim 2 wherein the scale selecting change-over means, the change-over means for changing the voltage variation range of the first component of the voltage applied to the instrument, the means for bringing the setting means into or out of use, the means for selecting the rate of control of the first temperature responsive means and the means for selecting the rate of control of the additional temperature responsive means are all gang controlled.

5. A meter as claimed in claim 2 wherein the amplifier is a differential amplifier with one input terminal fed with voltage appearing at the glass electrode and another fed through a feedback loop which includes the instrument and a temperature-sensitive resistance constituting the first temperature responsive means, means being provided for applying across a resistance in said loop and through either of two switch selectable resistance networks, a voltage derived from a fixed voltage source.

6. A meter as claimed in claim 5 wherein the additional temperature responsive means is a temperature sensitive resistance included in one diagonal of a bridge, the other of which is included in series with either of two switch selectable circuits across part of a source of potential for the amplifier and potential from the reference electrode is applied to a point in the first mentioned diagonal, one of the two switch selectable circuits including a variable resistance constituting the setting means and the switching being such that, when said one selectable circuit is switched in certain predetermined values of resistance are included in the ratio arms of the bridge and one end of the first mentioned diagonal is constituted by the slider of a potentiometer ganged with said variable resistance while, when the second of said selectable circuits is switched in, said end of the first mentioned diagonal is a fixed point and the values of certain other predetermined values of resistances in the ratio arms are changed.

7. A meter as claimed in claim 6 wherein the other end of said first mentioned diagonal is constituted by the adjustable member of a potentiometer.

8. A meter as claimed in claim 6 wherein the expanded scale has a central zero and the main scale has its zero at one end and the said second switch selectable circuit contains an added fixed resistance of such value that when the instrument is changed over from use of the main scale to use of the expanded scale the zero of the expanded scale is correctly in the middle of the range to which it has been set by the setting means.

9. A meter as claimed in claim 6 and including means for superimposing at will a predetermined potential in series between the bridge and the two selectable circuits substantially as and for the purpose specified.

References Cited in the file of this patent
UNITED STATES PATENTS
2,828,466     Staunton -------------- Mar. 25, 1958